United States Patent
Vin et al.

(10) Patent No.: US 10,255,111 B2
(45) Date of Patent: Apr. 9, 2019

(54) SYSTEM AND METHOD OF DERIVING APPROPRIATE TARGET OPERATING ENVIRONMENT

(75) Inventors: Harrick Mayank Vin, Pune (IN); Mohan Raj Velayudhan Kumar, Pune (IN); Pradeep Chintamani Unde, Pune (IN); Sandip Sadashiv Jadhav, Pune (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 345 days.

(21) Appl. No.: 13/584,212

(22) Filed: Aug. 13, 2012

(65) Prior Publication Data
US 2013/0046965 A1    Feb. 21, 2013

(30) Foreign Application Priority Data
Aug. 18, 2011 (IN) .......................... 2336/MUM/2011

(51) Int. Cl.
*G06F 9/50* (2006.01)
(52) U.S. Cl.
CPC .................................. *G06F 9/5077* (2013.01)
(58) Field of Classification Search
CPC .................................................. H04L 41/0803
USPC ........................................................ 709/226
See application file for complete search history.

(56) References Cited

U.S. PATENT DOCUMENTS

| | | | |
|---|---|---|---|
| 8,868,583 B2* | 10/2014 | Kitajima | G06F 17/30533 707/758 |
| 2008/0184225 A1 | 7/2008 | Fitzgerald | |
| 2009/0282404 A1* | 11/2009 | Khandekar | G06F 9/45558 718/1 |
| 2010/0306772 A1 | 12/2010 | Arnold et al. | |
| 2011/0004878 A1 | 1/2011 | Divoux | |
| 2011/0131589 A1 | 6/2011 | Beaty et al. | |
| 2011/0302578 A1* | 12/2011 | Isci | G06F 9/5077 718/1 |

OTHER PUBLICATIONS

Joseph L. Gabbard "User-Centered Design and Evaluation of Virtual Environments".

* cited by examiner

*Primary Examiner* — Kevin T Bates
*Assistant Examiner* — Emad Siddiqi
(74) *Attorney, Agent, or Firm* — HM Law Group LLP; Vani Moodley, Esq.

(57) ABSTRACT

The present invention relates to a configurable parameter driven system and method for providing an appropriate target operating environment based on user specific needs and enterprise objectives. The configuration parameters can be changed to account for newer computing environment solutions that could appear and could also be tailored for enterprise specific needs. The method fingerprint the end users' based on characteristics and requirements to derive user needs and enterprise criteria's. The method is systematic and flexible amenable to change in varying enterprise environment.

16 Claims, 5 Drawing Sheets

| | End User Computing ->Host(36) | | |
|---|---|---|---|
| | Main VDIRecommendation | | |
| | What | | |
| | No of Hosts | | 36 |
| 1 | Static Virtual Desktop | FP1 | 29 |
| 2 | Dynamic Virtual Desktop with Folder Redirection | FP2 | 1 |
| 3 | Dynamic Virtual Desktop with no Folder Redirection | FP3 | 1 |
| 4 | Dynamic Virtual Desktop with Application Virtualization Folder Redirection | FP4 | 1 |
| 5 | Dynamic Virtual Desktop with Application Virtualization Folder Redirection | FP5 | 0 |
| 6 | Virtualized Infrastructure with Terminal Service | FP6 | 4 |
| 7 | Streamed Virtual Service | FP7 | 0 |
| 8 | Dedicated Hardware Virtualization | FP8 | 0 |
| 9 | Traditional Desktop | FP9 | 0 |

Virtualized Infrastructure with Terminal Service Packing

Access Solution Analysis for TCS029709

| | Virtualized Infrastructure with Terminal Host Detail | | |
|---|---|---|---|
| 1 | TCS029115 | Microsoft Windows XP Professional Serv... | x86 |
| 2 | TCS029705 | Microsoft Windows XP Professional Serv... | x86 |
| 3 | TCS038329 | Microsoft Windows XP Professional Serv... | x86 |
| 4 | TCS038329 | Click on a row for detail  XP Professional Serv... | x86 |

Figure 4

| End User Computing -> Host(36) | | | |
|---|---|---|---|
| Main | VDIRecommendation | | |
| What | | | △ |
| | | FP2 | 1 |
| 2 | Dynamic Virtual Desktop with Folder Redirection | FP3 | 1 |
| 3 | Dynamic Virtual Desktop with no Folder Redirection | FP4 | 1 |
| 4 | Dynamic Virtual Desktop with Application Virtualization Folder Redirection | FP5 | 0 |
| 5 | Dynamic Virtual Desktop with Application Virtualization Folder Redirection | FP6 | 4 |
| 6 | Virtualized Infrastructure with Terminal Service | FP7 | 0 |
| 7 | Streamed Virtual Service | FP8 | 0 |
| 8 | Dedicated Hardware Virtualization | FP9 | 0 |
| 9 | Traditional Desktop | | |
| | Virtualized Infrastructure with Terminal Service | Access Solution Analysis for TCS029709 | |
| | Virtualized Infrastructure with Terminal Service Host Details | | |

| FP5(Preference 5) | FP6(Preference 4) | FP7(Preference 3) | FP8(Preference 2) | FP9(Preference 1) | Selected choices |
|---|---|---|---|---|---|
| ☐Remote Access=N | ☐ Remote Access=N | ☑Remote Access=N | ☑Remote Access=N | ☐ Remote Access=N | |
| ☐Managed=N | ☑ Managed=N | ☑Managed=N | ☐ Managed=N | ☑ Managed=N | |
| ☐LocalPrinting | ☐ LocalPrinting | ☑LocalPrinting | ☐ LocalPrinting | ☐ LocalPrinting | Candidates {FP6,FP7}, |
| ☐userPersonalization | ☐userPersonalization | ☐userPersonalization | ☐ userPersonalization | ☐ userPersonalization | Final {FP6} |
| ☐Agility | ☑ Agility | ☑Agility | ☐ Agility | ☐ Agility | |
| ☐Compliance | ☑ Compliance | ☑Compliance | ☐ Compliance | ☐ Compliance | |
| ☐Scalability | ☑ Scalability | ☑Scalability | ☐ Scalability | ☐ Scalability | |
| ☐DataSecurity | ☑ DataSecurity | ☑ DataSecurity | ☐ DataSecurity | ☐ DataSecurity | |
| ☐bcp | ☑ bcp | ☑ bcp | ☐ bcp | ☐ bcp | |

Figure 5

SYSTEM AND METHOD OF DERIVING APPROPRIATE TARGET OPERATING ENVIRONMENT

This application is claims benefit of Serial No. 2336/MUM/2011, filed 18 Aug. 2011 in India and which application is incorporated herein by reference. To the extent appropriate, a claim of priority is made to the above disclosed application.

FIELD OF THE INVENTION

The present invention generally relates to the field of virtual computing technology systems, and more particularly relates to selecting and deploying user and enterprise specific operating environment at end user desktop environment.

BACKGROUND OF THE INVENTION

Desktop virtualization offers a way to extend the benefits of virtualization by improving business agility and continuity, enabling anywhere access, improving security and compliance and integrated management—to the full desktop. There are multiple options in which virtual desktop could be deployed at an enterprise namely thick client, thin client and balance compute. The choice of deployment depends on various factors that include end user specific needs and enterprise requirements. The typical way of deployment model for virtual desktops is decided on expertise of certain individuals and is not quite systematic. Single right answer for deployment model or choice of desktop delivery option is inexistent. Each model or option has its own advantages, cost and lends itself to a particular type of user or work scenario.

As servers and PCs have proliferated, the need to more effectively manage and utilize these resources has risen to the forefront. Having said that, it cannot be concluded that virtualization is 'the' solution for all of end-user computational needs. There are a good number of use cases which definitely favor non-virtualized solution as-well. Hybrid solution is also a possibility for some use cases. In today's world, when an enterprise wants to evaluate viability of desktop virtualization in its environment, the enterprise has to do balancing act of meeting user's needs and enterprise goals. The user needs include flexibility in access (remote and/or offline), need to access special devices (like CD-ROM, USB, local printer), need for personalization and need to access various applications (graphic intensive, multimedia et cetera). On the other hand, enterprise goals that one needs to look at are compliance, data security, ease of management, agility, business continuity, data recovery, cost and employee satisfaction to name a few.

To meet these objectives, there are multiple options to choose from the list of available options. Each option has its cost, benefit, side effects and risks associated with it. As it turns out, it becomes quite challenging to select the right option for target state. This is because there may not be one right option to choose from and there may not be even one right option, given the as-is state of an enterprise. This assessment of as-is state of an enterprise is critical for choosing possible choices that leads to the desired target state. This assessment is rarely done systematically and solutions are provided based on the experience of select individuals. This may lead to a target state which may leave end users' unhappy and enterprise goals may remain unfulfilled.

It may be necessary to compare the results of various options as implemented in the enterprise environment. In traditional ways, it is quite difficult to exercise various "what-if" scenarios that could evaluate these choices in the context of the enterprise.

In the light of foregoing, what is required is a model solution that can assist selection of right set of alternatives from the list of available choices of virtual computing environments, based on the users' needs and enterprise goals. Such a solution should be able to correlate/map and normalize the need(s) with the available spectrum of delivery models and finally should be capable of deriving the appropriate delivery model that suits the given need.

OBJECTS OF THE INVENTION

In accordance with the invention, a method for deriving an appropriate target operating environment is provided.

It is an object of the present invention to provide a system and method that is capable of deriving an appropriate target operating environment suiting user's need and enterprise goals.

Another object of the present invention is to categorize target operating environment based on enterprise inputs and applications used by such enterprise.

It is also an object of the invention to provide flexible system and method amenable to changes in variable enterprise environments.

One of the other objects of the present invention is to enable multiple executions of the method according to reprioritized enterprise goal weights.

Yet another object of the present invention is to provide a system that obviates the need for an enterprise to balance user need and enterprise goals, by configuring it with an ability to assess viability of target computing in its environment.

In accordance with the aspect of the invention, the system is capable of meeting user specific needs of flexible accessibility, access to special hardware devices, personalization needs and various other application based needs.

In another aspect of the present invention, the system is well equipped to meet enterprise specific goals including compliance requirements, data security, management ease, agility, business continuity, costs and employee satisfaction.

SUMMARY OF THE INVENTION

The present invention provides a method and system, to recommend the appropriate target computing environment based on configuration parameters that could be extended to account for additional virtual desktop environment options that could be adopted and also could be tailored for enterprise and user specific needs and goals.

In accordance with one of the aspects of the present invention, a method is provided that selects the appropriate target computing environment for a given (as-is) user or host. The method comprises: defining a set of governing configuration parameters to determine one or more user characteristics and one or more goals corresponding to an enterprise; identifying at least one operating environment solution and creating an operating environment fingerprint corresponding to each identified operating environment by defining a set of default rules for each governing user characteristics suitability along with enterprise characteristics suitability of each identified solution; identifying at least one application from an application portfolio and creating a target application fingerprint wherein the application fingerprint is associated with at least one characteristic corresponding to the user and at least one goal corresponding to the enterprise; comparing the operating environment fingerprint and the target application fingerprint to obtain a similarity factor; and deriving at least one appropriate target operating environment based on the similarity factor to commensurate with a predetermined threshold value.

According to one of the other aspects of the present invention, a system for deriving an appropriate target operating environment is provided. The system is capable of deploying appropriate possible target computing environment fit to purpose, suiting user needs and requirements and enterprise goals. The system herein comprises: a means to define a set of governing configuration parameters to determine one or more user characteristics and one or more goals corresponding to an enterprise; a means for identifying at least one operating environment and creating an operating environment fingerprint corresponding to each identified operating environment by defining a set of default rules for each governing user characteristics suitability along with enterprise characteristics suitability of each identified solution; a means to identify at least one application from an application portfolio and creating a target application fingerprint wherein the application fingerprint is associated with at least one characteristic corresponding to the user and at least one goal corresponding to the enterprise; a means to compare the operating environment fingerprint and the target application fingerprint to obtain a similarity factor; and a means to present at least one target operating environment for the similarity factor to commensurate with a predetermined threshold value.

DETAILED DESCRIPTION OF THE INVENTION

Before the present method, system and communication enablement are described, it is to be understood that this invention is not limited to the particular methodologies, and hardware and network described, as these may vary within the specification indicated. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. Further it is to be noted that the terms "virtual computing environment"; "virtual desktop environment"; "virtual desktop infrastructure (VDI)" and "virtual operating environment" are interchangeable. Similarly the terms "target operating environment" and "target computing environment" are interchangeably used. The disclosed embodiments are merely exemplary methods of the invention, which may be embodied in various forms.

As used in this application, the terms "component/module" and "system" and the like are intended to refer to a computer-related entity, either hardware, a combination of hardware and software, software, or software in execution. For example, a component/module may be, but is not limited to being, a process running on a processor, a processor, an object, an instance, an executable, a thread of execution, a program, and/or a computer. By way of illustration, both an application running on a computer and the computer can be a component. One or more components/modules may reside within a process and/or thread of execution and a component/module may be localized on one computer and/or distributed between two or more computers.

To the extent that a particular computer system configuration is programmed to implement the present invention, it becomes a digital computer system within the scope and spirit of the present invention. That is, once a digital computer system is programmed to perform particular functions pursuant to computer-executable instructions from program software that implements the invention described heretofore, it in effect becomes a special purpose computer particular to the present invention. The necessary programming-related techniques are well known to those skilled in the art and thus are not further described herein for the sake of brevity.

Figure 1:
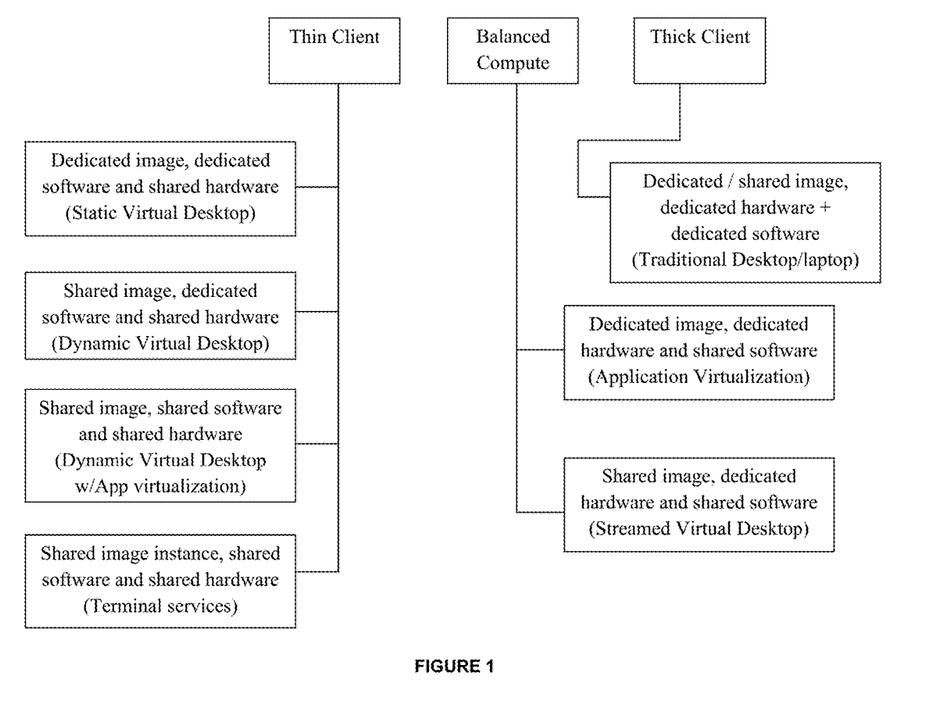
FIG. 1 is a block diagram representing various choices of operating environments available for deploying at end user location, as known in the art.

Virtualization is the framework to divide the resources of a computer into multiple execution environments using a variety of hardware and software abstraction techniques, resulting in the separation of the logical interface from the physical machine. There are numerous choices available for desktop virtualization and conceptually, we can broadly divide these choices into two types of End user Computing Virtualization—Desktop virtualization and Application virtualization. However, they could also be thought of as to how they are delivered to the end users' and could be divided into three options—thin client, thick client and balanced compute. FIG. 1 depicts these choices and their sub-choices.

Desktop virtualization is a method of providing an end-user with a complete operating environment (operating system, applications, data, et cetera) that is separate from their locally installed desktop operating system. In other words, an end-user accesses his/her desktop (hosted in a datacenter as/in a large server) through an end-point device from within the scope of organizations' network range/authentication boundary.

Referring again to FIG. 1, various choices of desktop virtualization, as available, for deploying at end user location is presented. These choices are described herein briefly.

Dedicated System (blade PC)—Desktop is packaged in a blade and installed in a rack in datacenter. End user accesses the desktop using a monitor that is connected to this blade. This option is typically suitable for power users' (e.g. stock traders, researchers, CAD/CAM users' etc.) who need a powerful personalized environment, dedicated resources, and high availability. However, dedicating server hardware to individual users' is expensive compared to other desktop implementations.

Static Virtual Desktop—Each user accesses a unique environment, running as virtual machines (VM) on a shared physical system (often a large server), typically housed in a datacenter. OS image and software is dedicated, only the hardware is shared between end users'. This suits knowledge workers (e.g. sales, finance) who need a personalized environment, but not dedicated hardware. However, any system slow down or failure affects multiple users', and such systems require significant hardware resources.

Dynamic Virtual Desktop—This is similar to Static Virtual Desktop, but with a minor difference. OS image and hardware both are shared. Software that the user needs is provision this type of VMs is less compared to the earlier two approaches. This type of approach is suitable for stateless light-weight application usage/needs.

Terminal Services—Each end-user accesses an identical desktop, using Terminal Services on a shared physical system (often a large server). This suits process workers (e.g. CSRs, telesales) who all use a common, low-powered environment. Deploying desktop provides extremely efficient use of server hardware, but allows very limited personalization, and system problems affect all sharing users'. Not just OS image, but, instance of the image is also shared between users' along with the software and hardware.

Balanced Compute—Also called Streamed desktop approach. Client (end-user compute point device) boots via PXE or tftp boot [network boot] from shared bootstrap OS image. Using this method, end-points' System resources (CPU, memory) are used to perform computation type activity. This type of approach is suitable for light-weight operating environment usage/needs.

Traditional Desktop/Laptop—This is also called stand-alone installation, where-in the end-user has his own physical desktop machine with OS and requisite applications at his workplace. Here OS image, hardware and software all are dedicated.

Application Virtualization is a method of providing a specific application to an end user in a way that is abstracted from the desktop OS, and not installed in a traditional manner. There are three deployment models—application isolation, application streaming and web-based.

Application Isolation—Application is installed and/or executed locally in an isolated 'sandbox' that prevents interaction with other system and application components. This suits users' that need to run conflicting applications, because it completely isolates applications, but it may also prevent some normal interactions like file access and cross application communications (e.g. OLE, cut-and-paste).

Application Streaming—Application is delivered across the network, allowing immediate access to core functions, while non-core components are downloaded in the background. This suits users' with one-off or temporary application needs (e.g. contractors), as it allows rapid user-initiated provisioning and easy license harvesting. However, it requires network connectivity for at least the initial delivery/use (streamed applications can be locally cached for subsequent disconnected use), and is not compatible with all applications. Streaming is the technique often used for implementing Application Virtualization.

Web-based Applications—Applications are delivered across the network to a Web browser with most processing executed on a centralized (Web) server. This supports almost any user, with no installation requirement, on almost any platform, in any location, but it only supports a limited set of applications, requires full-time network connectivity, and has potential security implications.

Given these choices of implementing a virtual operating environment, few important questions that need critical analysis in making a systematic judgment are:
  Pros and cons with each delivery model
  End-users' compute/usage requirement//needs
  Enterprise requirement/needs
  Characteristics of users' need and enterprises' goal
  Governing set of rules aiding selection of the delivery model Keeping in view the above stated critical analyses of various parameters while making a choice for a virtual operating environment, the present invention is directed to provide a set of decision parameters (also called Fingerprint) from end-user and enterprise perspective and uses this finger-print values in finalizing the appropriate delivery model deemed fit to purpose and an implementation of the same. The invention further highlights the high level steps required to systematically infer or propose the appropriate target operating environment approach for a given(as-is) user/host. The procedural flow for these high level steps is discussed in detail below:

Step 1 includes understanding of the requirements of end-users'. For the same, application(s) accessed by users' is used as a measure to get an insight into the purpose that user serves in an organization. Also, information regarding devices utilized to access the applications is inferred.

Step 2 includes identification of one or more applications from the accessed applications to create an application portfolio.

Step 3 involves running a target operating environment fitness analysis on the users'/hosts' target application(s). Outcome of this step gives the appropriate operating environment approach. Both user and enterprise goals are taken into consideration in arriving at the final outcome.

Figure 2:
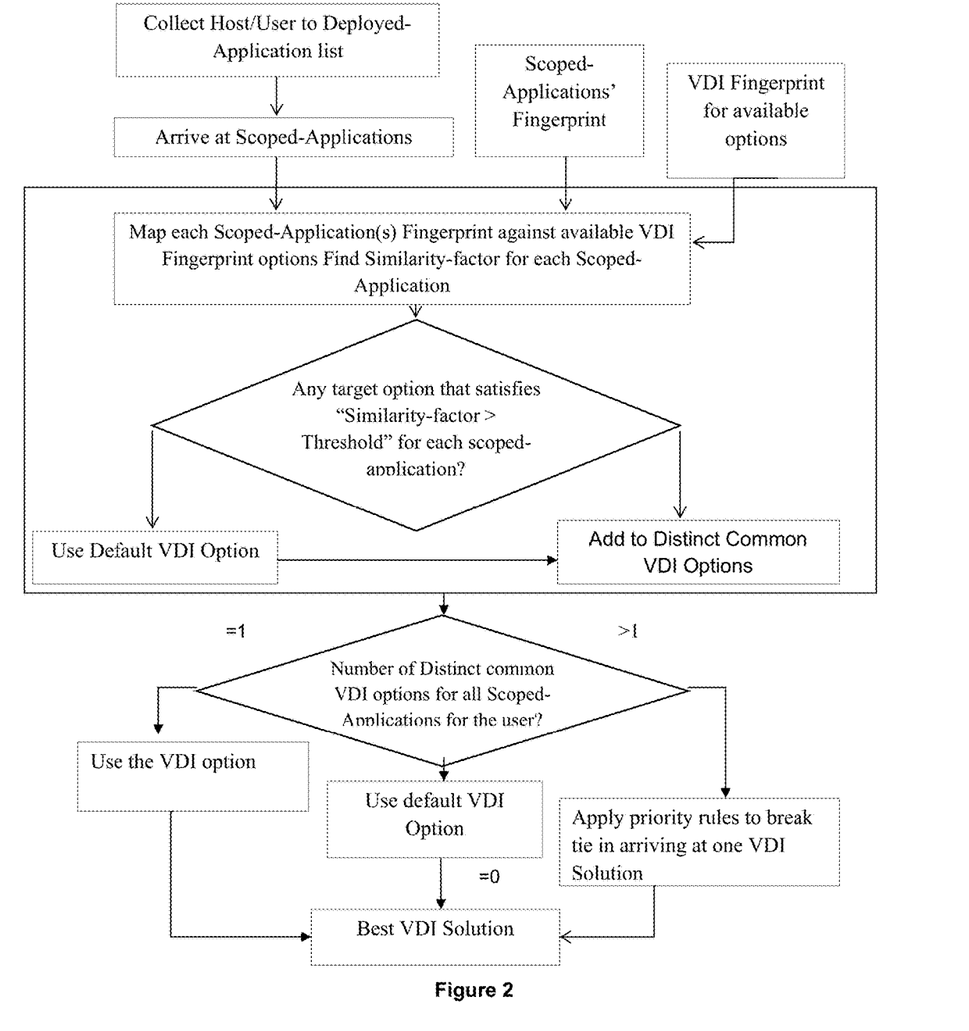
FIG. 2 illustrates logical workflow adopted for arriving at the appropriate target operating environment, in accordance with principal embodiment of the present invention.

Now, referring to FIG. 2, a logical workflow adopted for arriving at the appropriate target computing environment, utilizing a configuration driven generic framework of the system in accordance with principal embodiment of the present invention is provided. This framework is also called as "finger printing framework" and is used to
a) add/define a new operating environment delivery option in terms of user and enterprise characteristics, modify an existing operating environment option and delete an existing operating environment option;
b) add/remove/modify application user and enterprise characterization;
c) define controls;
d) execute the target operating environment fitness analysis algorithm;
e) report back on the appropriate operating environment approach for each host.

The benefit of such configuration driven approach to recommend the appropriate target operating environment solution is that the configuration parameters could be changed to account for newer operating environment options that could appear and also could be tailored for enterprise specific needs.

Finger Print formulation method comprises of Application Finger Print process and operating environment options Finger Print process. Optimum solution algorithm uses Application Finger Print definitions and operating environment Finger Print rules to arrive at the appropriate To-Be (target state) target operating environment approach.

Referring again to FIG. 2, each operating environment solution/approach is characterized for user and enterprise characteristics that each option satisfies. The set of governing parameters that determine user characteristics and requirements are defined and discussed below.

a) Access
   Remote (over the Internet)
   Offline (Disconnected mode)
b) Hardware
   Access to special h/w—USB, CD-ROM,
c) Dongle etc.
   Local Printing
d) Personalization
   Preferences/user settings
   User data
e) Applications
   Remote/local data storage
   Need to use Graphic, Multimedia intensive applications Similarly a set of governing parameters are defined to characterize enterprise goals, as stated below.

a) Compliance
b) Data Security
c) Management Ease
d) Agility
e) Scalability
f) Disaster Recovery/Business Continuity Next, two services for each operating environment option are created. First service for an operating environment is a collection/set of rules corresponding to user requirements; second service is a collection/set of rules corresponding to enterprise goals. Rules are conditions or validations that determine if a particular operating environment option satisfies user requirements and enterprise goals. Some of these rules in these services can be marked mandatory and some optional. To start with, operating environment approach rules are defined primarily by a SME and also based on experience. This way a "finger print" for each possible operating environment option available is created which basically identifies each option's suitability in the context of user needs and enterprise needs. For example, if there are 9 possible operating environment solution choices, then 9 operating environment Finger Print definitions are needed. The definitions of these operating environment choices are created in a configuration file and input to the tool.

Further, for each target application, as shown in FIG. 2, characterization for user characteristics and enterprise characteristics is done. This is basically creating reference data for each target application. This combination of target application(s) to user and enterprise centric parameter map is called Application Finger Print. This target application finger print process can be further abstracted to higher levels like user groups or application-groups et cetera. The framework is designed in such a way that the target application(s), parameter definition and values i.e., Application Finger Print can be controlled or managed from an external feed (could be driven via a file or property set). To create Application Finger Print, assistance from SME and experienced professionals is acquired.

Figure 3:
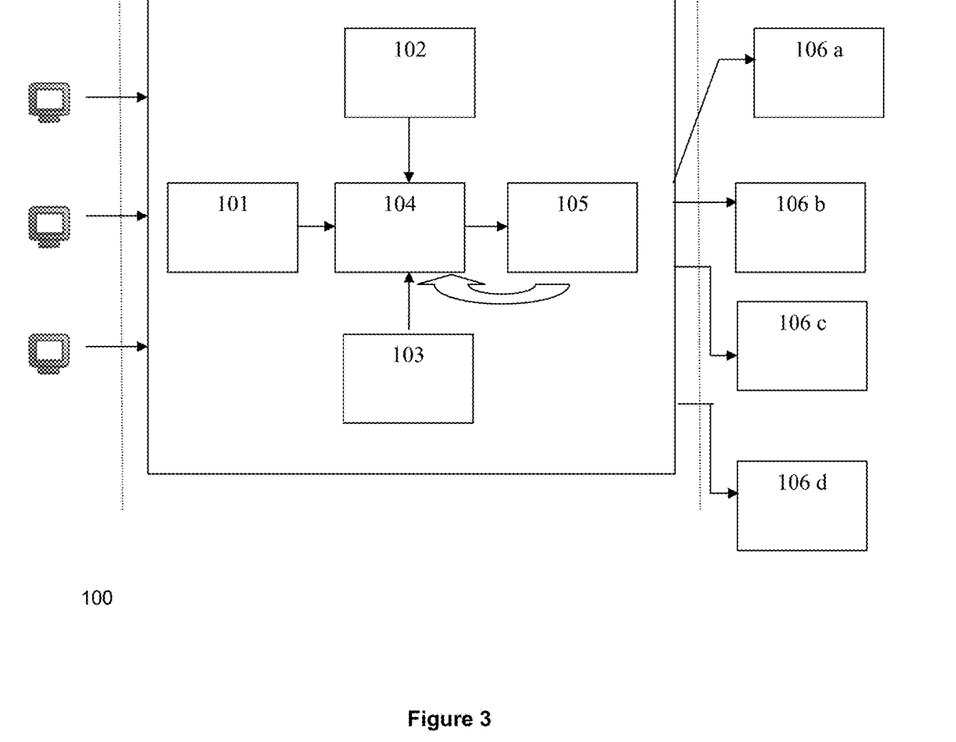
FIG. 3 is an architectural representation of various modules constituting the present system in accordance with one of the exemplary embodiments of the present invention.

FIG. 2 along with FIG. 3, further depicts the logical steps that are adopted to arrive at the appropriate target operating environment approach solution. The detailed two step process is followed: a) for a given host (for e.g., desktop), all target applications deployed on that host are looked up and all the operating environment options that satisfy the user characteristics are identified. This is decided by looking at how many user characteristics out of total user characteristics are matched for that application and only selecting operating environment target options for which this match exceeds a configurable threshold. This list of matched operating environment options is then passes to step2-b) out of the operating environment options that satisfy the user characteristics, all the operating environment options which satisfy the enterprise characteristics are identified. Here also a threshold based approach is used to find the closest matching set of operating environment target options. The detailed sequential logic followed in the present solution is elaborated in the below. Notations used by the solution are tracked in Table 1.

TABLE 1

| Notation | Explanation |
| --- | --- |
| Target Applications | At least one Application (list of applications) finding appropriate target environment |
| Application Portfolio | Installed applications for a given host (EUC endpoint device) |
| Total Operating Environment | Total number of possible operating environments defined |
| Operating Environment Finger Print (i) | Fingerprint of each of the possible operating environment 0 > i >= Total operating environment |
| Application Finger Print (j) | Finger print for each target Applications 0 > j >= number of applications in application portfolio |
| Similarity Factor of operating environment | Closeness-value between Application Finger Print and operating environment Finger Print = (number of exact matches between operating environment Finger Print to corresponding Application Finger Print value) ÷ (total-number of parameters in operating environment Finger Print) It also accounts for mandatory check conditions |
| Match Threshold | Acceptable or minimum Similarity Factor value |
| Acceptable Similarity Factor | Is when the derived similarity Factor >= Threshold |
| Operating Environment Priority | Gives the appropriate operating environment when a host has >1 operating environment possible solutions |
| Default Operating Environment (OE) | Default or safe-bet operating environment solution [for example: traditional desktop/laptop is used as the default] |
| Tracked operating environment Solution | Track the entire operating environment Finger Print (i) which has an acceptable Similarity Factor value for each application. |

The process flow defining the approach adopted to derive appropriate target operating environment is detailed in a set of instructions, here below.

In the first step, user-application collector module 101 collects the applications deployed in the user's host to build an application portfolio. For each application in Application portfolio, an application fingerprint is created by an Application Finger Print model 102 which tracks attributes (users' and enterprises') and values which signify the application characteristics. Similarly, for each available operating environment option, an operating environment option Finger Print is created by target option fingerprint model 103, which is entrusted with the task of tracking attributes and values which signify the option.

In 104, for each application in the application portfolio, the corresponding application finger print is mapped against each of the available operating environment option finger prints. The result of this mapping process is the similarity factor value, which is the ratio of number of matched attributes between both application finger print and operating environment option finger prints to the total attributes in operating environment option finger print.

This similarity-factor is validated against a preset cut-off value called Threshold. Reducing threshold might allow more applications to come under one target solution, increasing it might reduce number of applications under one target solution. It acts as a lever to control the lower limit of degree of matching between application and target solution fingerprints. Threshold can be provided via a configuration entry. If the match Factor or similarity factor is found to be less than the predetermined match Threshold, it can be concluded that none of the available operating environment option is appropriate. However, if the match factor exceeds the predetermined threshold value, an access solution collector 105 finalizes the possible operating environment option solution(s) 106 (*a, b, c, d*)—Dedicated Server, Terminal Servers, Virtualized Servers—dynamic virtual machines, dedicated virtual machines, virtual machines with application virtualization etc.

This can be illustrated with an example discussed below:

In one of the embodiment of the target computing environment, threshold value of 75% is assumed.

If the similarity ratio results of mapping between application fingerprint and different access solution fingerprint are depicted as follows Dedicated Server: 20%
Terminal Services: 75%
Dedicated Virtual Machine: 80%

So, a possible access solution option that satisfies the threshold criteria would be "Terminal Services" and "Dedicated Virtual machine".

Another case may be of a situation when none of the access solution options satisfies the threshold criteria.

For example if the similarity ratio result of mapping between applications fingerprint and different access solution fingerprint is as follows Dedicated Server: 20%
Terminal Services: 65%
Dedicated Virtual Machine: 70%

None of the access solution would ideally qualify the threshold criteria.

One of the other embodiments of the present invention suggests a default Operating Environment for the application in a scenario where none of the operating environment options from the available list is found suitable. Alternatively, the operating environment option is added to tracked operating environment solution for the application, which gets iterated for each of the chosen operating environment option. The filtered operating environment option that matches enterprise goals and criteria gets updated.

In one of the other embodiments of the present invention, an operating environment priority solution is introduced whenever there is a common operating environment Finger Print in Tracked operating environment solution across Interested Applications. In such a case more than one common operating environment Finger Print exists, then the appropriate solution is identified by running the application against operating environment priority solution based on defined priority rules.

The system 100 further comprises of pluggable modules for fingerprint, threshold, priority rules and default rules which can be extended by adding fingerprints, configuration parameters and rules without any modification into the source code.

Figure 4:
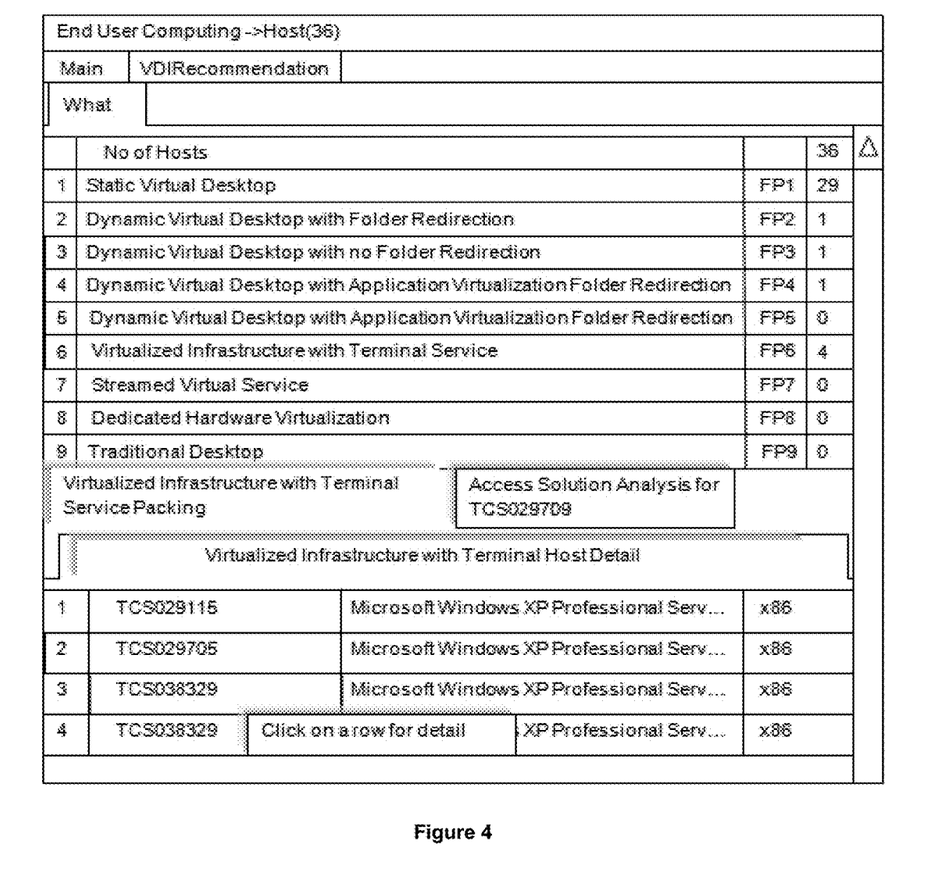
FIG. 4 depicts a snapshot of test implementation of the system, according to one of the embodiments of the present invention.
Figure 5:
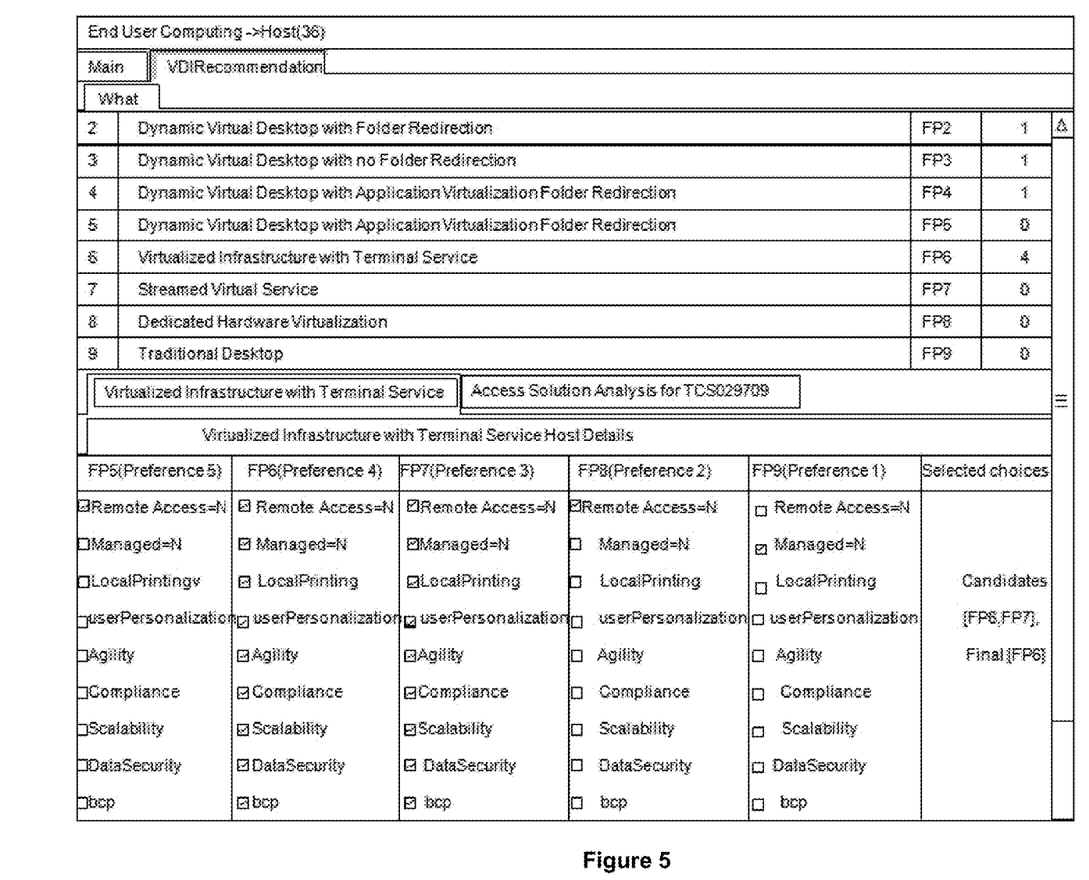
FIG. 5 is a representation of target strategy with respect to target computing along with end user and enterprise fingerprint, according to one of the embodiments of the present invention.

In one of the other embodiments of the present invention, the test implementation of the set up proposed in the present invention for a virtualized desktop environment is captured in FIG. 4 and FIG. 5. FIG. 4 shows the result of applying the approach to an environment and shows the details of options tried and the appropriate target state for various end user desktops.

FIG. 5 shows the details of user finger prints and target solution finger print and how the matching is done. If the appropriate desktop environment result point to physical standalone approach, the Target deployment architecture is straight forward. But if the environment solution is based on virtualized desktop approach, the target deployment architecture needs to be properly sized. In this aspect, a version of appropriate-fit optimal bin-packing solution, as discussed above, to drive the packing factor [how many virtual machine desktops can be accommodated into a given physical server] is preferably employed.

The method and system of the present invention has major advantageous feature of identifying which specific operating environment To-Be target state approach is best suited for the user or As-Is host. The approach is found to be systematic as it is reference data based and flexible as it is amenable to changes in enterprise environments. The invention further provides advantageous features wherein it allows the user to run multiple scenarios to do the what-if analysis. One such example of the what-if scenario is reprioritizing the enterprise goal weights and rerun the approach. This is quiet unique and also gives more transparency into the process of deriving the target solution for desktop virtualization. One important part to make the approach successful is data gathering. It is absolutely critical to have data for all the desktops that include static (inventory) and dynamic data. Inventory data includes make, model and other details of hosts and list of deployed/used applications per such host. The dynamic data like system, application usage data et cetera, are needed to be able to size the target environment in the virtualized environment.

The methods and systems described herein may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. The software programs may be stored on or in one or more articles of manufacture as object code.

The invention claimed is:

1. A method for deriving and deploying a right sized user and enterprise specific target operating environment, the method comprising: defining, by a processor, a set of configurable decision parameters associated with characteristics corresponding to user requirements and enterprise goals, wherein the user requirements and the enterprise goals are identified from a user or host's work environment based on static and dynamic data associated with the user or host's work environment, wherein defining the user requirements and enterprise goals in terms of the decision parameters enables accurate and systematic capturing of the user requirements and enterprise goals, wherein the set of decision parameters can be added, modified or changed to meet dynamic user requirements and enterprise goals, wherein the static data comprising make and model details associated with the user's or host's work environment and a list of applications deployed or used in the user's or host's work environment and the dynamic data comprising application usage data associated with the user or host's work environment, wherein the user's requirements comprise at least one of a flexibility in remote access and/or offline access, a need to access one or more devices deployed in the user's or host's work environment, a need for personalization of settings, and/or a need to access one or more applications deployed in the user's or host's work environment, and wherein the enterprise goals comprising compliance, data security, ease of management, agility, business continuity, data recovery, processing cost, scalability, and disaster recovery identifying, by the processor, one or more operating environments for the user or host's work environment based on the set of configurable decision parameters; creating, by the processor, an operating environment fingerprint for each of the one or more operating environments by defining a set of rules, wherein the set of rules are defined using the set of configurable decision parameters, by defining operating environment attributes in terms of the set of configurable decision parameters and associated values for the set of configurable decision parameters and wherein the set of rules are conditions or validations to determine if the user requirements and the enterprise goals are satisfied by the associated operating environment, and wherein at least one rule of the set of rules is allocated one of an optional status or a mandatory status, and wherein a Boolean value is assigned to at least one decision parameter of the set of configurable decision parameters, based on the user requirements and the enterprise goals, wherein defining the set of rules in terms of the configurable decision parameters enables accurate specification of the operating environment fingerprints, and wherein the set of rules can be modified, added or deleted from the operating environment fingerprints to meet the user requirements and the enterprise goals without modifying a source code; identifying, by the processor, target applications from a set of target applications available in the user or host's work environment having the characteristics corresponding to the user requirements and the enterprise goals; creating, by the processor, a target application fingerprint for each of the target applications by defining target application attributes in terms of the set of configurable decision parameters and associated values for the set of configurable decision parameters, satisfying the characteristics corresponding to the user requirements and the enterprise goals; computing, by the processor, a similarity factor between the target application fingerprint and the operating environment fingerprint by comparing each of the operating environment fingerprint with the target application fingerprint, wherein defining the target application fingerprint and the operating environment fingerprint using the set of configurable decision parameters enables systematic and accurate checking if the conditions or validations associated with the operating environment attributes are met by the target application attributes, wherein the similarity factor is a ratio of a number of the operating environment decision parameters matched with the target application decision parameters to total operating environment decision parameters in the operating environment finger print; and deriving and deploying, by the processor, a right sized target operating environment for the user or the host by repetitively executing a plurality of scenarios of the user's or host's work environment to perform what if analysis while comparing the operating environment fingerprint with the target application fingerprint, to verify meeting of the dynamic user requirements and enterprise goals, by reprioritizing the enterprise goals based on the static and dynamic data associated with the user or host's work environment, to select the right sized target operating environment from the one or more operating environments, based on of the similarity factor, thereby deriving and the right sized target operating environment for the user or the host.

2. The method of claim 1, wherein the target operating environment is derived by defining a priority based on at least one priority rule when more than one operating environments are identified based on a threshold value of the similarity factor.

3. The method of claim 2 further comprising provisioning a default target operating environment when the similarity factor is less than the threshold value.

4. The method of claim 1, wherein the characteristics comprises hardware modules deployed, personalized settings, and requirements of the one or more target application available in the user work environment.

5. The method of claim 1, wherein the target operating environment is derived from the operating environment finger print and the target application finger print, having the similarity factor equal to or exceeding a threshold value of the similarity factor.

6. The method of claim 5, wherein a user regulates the threshold value of the similarity factor to derive required target operating environment.

7. The method of claim 1 further comprises identifying the one or more target applications from a plurality of target applications, wherein the one or more target applications are having the characteristics corresponding to the one or more user requirements and the one or more enterprise goals.

8. The method of claim 1, wherein the one or more operating environments are heterogeneous operating environments comprising a static virtual desktop, a dynamic virtual desktop, a dynamic virtual desktop without app virtualization, a terminal services, a traditional desktop, a laptop, an application, an application virtualization, and a streamed virtual desktop, a streamed virtual service, a dedicated hardware virtualization, a dynamic virtual desktop with folder redirection, a dynamic virtual desktop with no folder redirection, and a virtualized infrastructure with terminal service.

9. The method of claim 1, wherein the decision parameters associated with the user requirement comprises 'offline access', 'remote access', 'access to special hardware', 'remote data storage', 'local data storage', 'need to use graphic', 'need to use multimedia applications', 'managed', 'local printing', 'user personalization', and the decision parameters associated with the enterprise goals comprises 'management ease', 'disaster recovery', 'business continuity', 'agility', 'compliance', 'scalability', and 'data security'.

10. The method of claim 1 further comprises adding the operating environment fingerprints, the target application fingerprints, the set of decision parameters and the set of rules without any modifications into application code.

11. The system of claim 1 further comprises adding the operating environment fingerprints, the target application fingerprints, the set of decision parameters and the set of rules without any modifications into application code.

12. A system for deriving and deploying a right sized user and enterprise specific target operating environment, the system comprising: a memory; and a processor coupled to the memory, wherein the processor executes program instructions stored in the memory to; define a set of configurable decision parameters associated with characteristics corresponding to user requirements and enterprise goals, wherein the user requirements and the enterprise goals are identified from a user or host's work environment based on static and dynamic data associated with the user or host's work environment, wherein defining the user requirements and enterprise goals in terms of the decision parameters enables accurate and systematic capturing of the user requirements and enterprise goals, wherein the set of decision parameters can be added, modified or changed to meet dynamic user requirement and enterprise goals, wherein the static data comprising make and model details associated with the user's or host's work environment and a list of applications deployed or used in the user's or host's work environment and the dynamic data comprising application usage data associated with the user or host's work environment, wherein the user's requirements comprise at least one of a flexibility in remote access and/or offline access, a need to access one or more devices deployed in the user's or host's work environment, a need for personalization of settings and/or a need to access one or more applications deployed in the user's or host's work environment, and wherein the enterprise goals comprising compliance, data security, ease of management, agility, business continuity, data recovery, processing cost, scalability, and disaster recovery; identify one or more operating environments for the user or host's work environment based on the set of configurable decision parameters; create an operating environment fingerprint for each of the one or more operating environments by defining a set of rules, wherein the set of rules are defined using the set of configurable decision parameters, by defining operating environment attributes in terms of the set of configurable decision parameters and associated values for the set of configurable decision parameters, wherein the set of rules are conditions or validations to determine if the user requirements and the enterprise goals are satisfied by the associated operating environment, and wherein at least one rule of the set of rules is allocated an optional status or a mandatory status and wherein a Boolean value is assigned to at least one decision parameter of the set of configurable decision parameters, based on the user requirements and the enterprise goals, wherein defining the set of rules in terms of the decision parameters enables accurate specification of the operating environment fingerprint, and wherein the set of rules can be modified, added or deleted from the operating environment fingerprints to meet the user requirements and the enterprise goals without modifying a source code; identify target applications from a set of target applications available in the user or host's work environment having the characteristics corresponding to the user requirements and the enterprise goals; create a target application fingerprint for each of the target applications, wherein the target application fingerprint comprises target application attributes in terms of the set of configurable decision parameters and corresponding values for the set of configurable decision parameters, satisfying the characteristics corresponding to the user requirements and the enterprise goals; compute, a similarity factor between the target application fingerprints and the operating environment fingerprints by comparing each of the operating environment fingerprint with the target application fingerprint, wherein defining the target application fingerprint and the operating environment fingerprint using the set of configurable decision parameters enables systematic and accurate checking if the conditions or validations associated with the operating environment attributes are met by the target application attributes, wherein the similarity factor is a ratio of a number of the operating environment decision parameters matched with the target application decision parameters to the total operating environment decision parameters in the operating environment finger print; and derive and deploy, a right sized target operating environment for the user or the host by repetitively executing a plurality of scenarios of the user's or host's work environment to perform what if analysis while comparing the operating environment fingerprint with the target application fingerprint, to verify meeting of the dynamic user requirements and enterprise goals, by reprioritizing the enterprise goals based on the static and dynamic data associated with the user or host's work environment to select an the right sized target operating environment from the one or more operating environments, based on the similarity factor, thereby deriving and deploying the right sized target operating environment for the user or the host.

13. The system of claim 12, wherein the target operating environment is derived by defining a priority based on at least one priority rule when more than one operating environments are identified based on a threshold value of the similarity factor.

14. The system of claim 12, wherein the target operating environment is derived from the operating environment finger print and the target application finger print, having the similarity factor equal to or exceeding a threshold value of the similarity factor.

15. The system of claim 12, wherein a user regulates the threshold value of the similarity factor to derive required target operating environment.

16. The system of claim 12 further identities the one or more target applications from a plurality of target applications, wherein the one or more target applications are having the characteristics corresponding to the one or more user requirements and the one or more enterprise goals.

* * * * *